(12) United States Patent
Okada et al.

(10) Patent No.: US 12,488,294 B2
(45) Date of Patent: Dec. 2, 2025

(54) WORK PLANNING ASSISTANCE DEVICE AND WORK PLANNING ASSISTANCE METHOD

(71) Applicant: KOBELCO CONSTRUCTION MACHINERY CO., LTD., Hiroshima (JP)

(72) Inventors: Satoshi Okada, Tokyo (JP); Tomotaka Mitani, Tokyo (JP); Nobuhiro Takamatsu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 134 days.

(21) Appl. No.: 18/561,968

(22) PCT Filed: Mar. 1, 2022

(86) PCT No.: PCT/JP2022/008606
§ 371 (c)(1),
(2) Date: Nov. 17, 2023

(87) PCT Pub. No.: WO2022/244374
PCT Pub. Date: Nov. 24, 2022

(65) Prior Publication Data
US 2024/0273425 A1    Aug. 15, 2024

(30) Foreign Application Priority Data
May 21, 2021    (JP) ................. 2021-086523

(51) Int. Cl.
*G06Q 10/0631*    (2023.01)
*G06Q 50/08*    (2012.01)

(52) U.S. Cl.
CPC ......... *G06Q 10/0631* (2013.01); *G06Q 50/08* (2013.01)

(58) Field of Classification Search
CPC .................................................. G06Q 10/0631
See application file for complete search history.

(56) References Cited

U.S. PATENT DOCUMENTS

| 8,095,346 B2 | 1/2012 | Fukuda et al. |
| 2009/0192772 A1* | 7/2009 | Fukuda ................. G06Q 10/06 703/6 |

(Continued)

FOREIGN PATENT DOCUMENTS

| CN | 110155883 A | * | 8/2019 |
| JP | 2009-169777 A | | 7/2009 |

(Continued)

OTHER PUBLICATIONS

Zhang et al. "Minimum-Time Trajectory Planning for Underactuated Overhead Crane Systems With State and Control Constraints" (2014) (https://ieeexplore.ieee.org/stamp/stamp.jsp?tp=&arnumber=6805639) (Year: 2014).*

(Continued)

*Primary Examiner* — Sujay Koneru
(74) *Attorney, Agent, or Firm* — Oblon, McClelland, Maier & Neustadt, L.L.P.

(57) ABSTRACT

A system is capable of reducing effects of how much knowledge/experience a user has and making it easy for the user to decide a plan for work by a crane. It is possible to cause a user who has specified first carriage points through a terminal input interface to grasp an arrangement aspect and specifications of a crane for carrying materials to the first carriage points (or from the first carriage points) by the crane while avoiding interference of the crane and the materials with a building, through a secondary work situation image output to a terminal output interface of an information terminal.

6 Claims, 8 Drawing Sheets

(56) References Cited

U.S. PATENT DOCUMENTS

| | | | |
|---|---|---|---|
| 2016/0034608 A1* | 2/2016 | Delplace | B66C 13/46 |
| | | | 703/1 |
| 2019/0094834 A1* | 3/2019 | Bramberger | G09B 9/04 |
| 2020/0115195 A1* | 4/2020 | Lee | G06V 10/235 |
| 2022/0284366 A1* | 9/2022 | Kelly | B66C 13/18 |
| 2023/0401356 A1* | 12/2023 | Tago | G06F 30/20 |

FOREIGN PATENT DOCUMENTS

| | | |
|---|---|---|
| JP | 2020-194426 A | 12/2020 |
| JP | 2021-22020 A | 2/2021 |
| KR | 10-2018-0055130 A | 5/2018 |
| WO | WO 2021/049112 A1 | 3/2021 |

OTHER PUBLICATIONS

International Search Report issued May 31, 2022 in PCT/JP2022/008606, filed on Mar. 1, 2022, 2 pages.
Extended European Search Report issued Sep. 17, 2024 in European Patent Application No. 22804295.8, 8 pages.

* cited by examiner

WORK PLANNING ASSISTANCE DEVICE AND WORK PLANNING ASSISTANCE METHOD

TECHNICAL FIELD

The present invention relates to a technique for assisting with work of carrying a load suspended by a crane, and the like.

BACKGROUND ART

There is proposed a technique for, in a work simulation system for plant construction, reflecting a content of evaluation/analysis on specification inputs by a user and making adjustments so that a content of the specification inputs is included within an input range among set value input units that are mutually related, in order to realize improvement of efficiency of whole construction work (see, for example, Patent Literature 1).

CITATION LIST

Patent Literature

Patent Literature 1: Japanese Patent Laid-Open No. 2009-169777

SUMMARY OF INVENTION

Technical Problem

According to a difference in knowledge and/or experience among users, there may be a case where it is not easy to decide a work plan, including where around a building which crane with which performance is to be arranged.

Therefore, an object of the present invention is to provide a system and the like capable of reducing effects of how much knowledge/experience a user has and making it easy for the user to decide a plan for work by a crane.

Solution to Problem

A work planning assistance device of the present invention comprises:
  a first planning assistance processing component configured to cause a primary work situation image indicating a space occupation aspect of a building and an arrangement aspect of a plurality of candidate carriage points to be output to an output interface, recognize candidate carriage points specified through an input interface from among the plurality of candidate carriage points as first carriage points, and cause the first carriage points to be output to the output interface in a form distinguishable from second carriage points, which are other candidate carriage points, in the primary work situation image; and
  a second planning assistance processing component configured to recognize material attributes specified through the input interface, recognize an arrangement aspect and specifications of a crane for carrying materials having the material attributes to the first carriage points while avoiding interference of each of the crane and the materials with the building, based on the space occupation aspect of the building, an arrangement aspect of the first carriage points, and the material attributes, generate a secondary work situation image, the secondary work situation image being the primary work situation image to which the arrangement aspect and the specifications of the crane are added, and cause the secondary work situation image to be output to the output interface.

According to the work planning assistance device in the above configuration, it is possible to cause a user to grasp the space occupation aspect of the building and the arrangement aspect of the plurality of candidate carriage points, through the primary work situation image output to the output interface. Thereby, it is possible to cause the user to take a guess which candidate carriage points at which positions are to be specified as the first carriage points, in consideration of the space occupation aspect of the building and the arrangement aspect of the plurality of candidate carriage points.

Furthermore, it is possible to cause the user who has specified the first carriage points through the input interface to grasp the arrangement aspect and the specifications of the crane for carrying the materials to the first carriage points (or from the first carriage points) by the crane while avoiding interference of the crane and the materials with the building, through the secondary work situation image output to the output interface. Thereby, it is possible to make it easier to decide a work plan including selection of the arrangement aspect and the specifications of the crane according to a specification aspect of the first carriage points.

DESCRIPTION OF EMBODIMENTS (Configuration)

Figure 1:
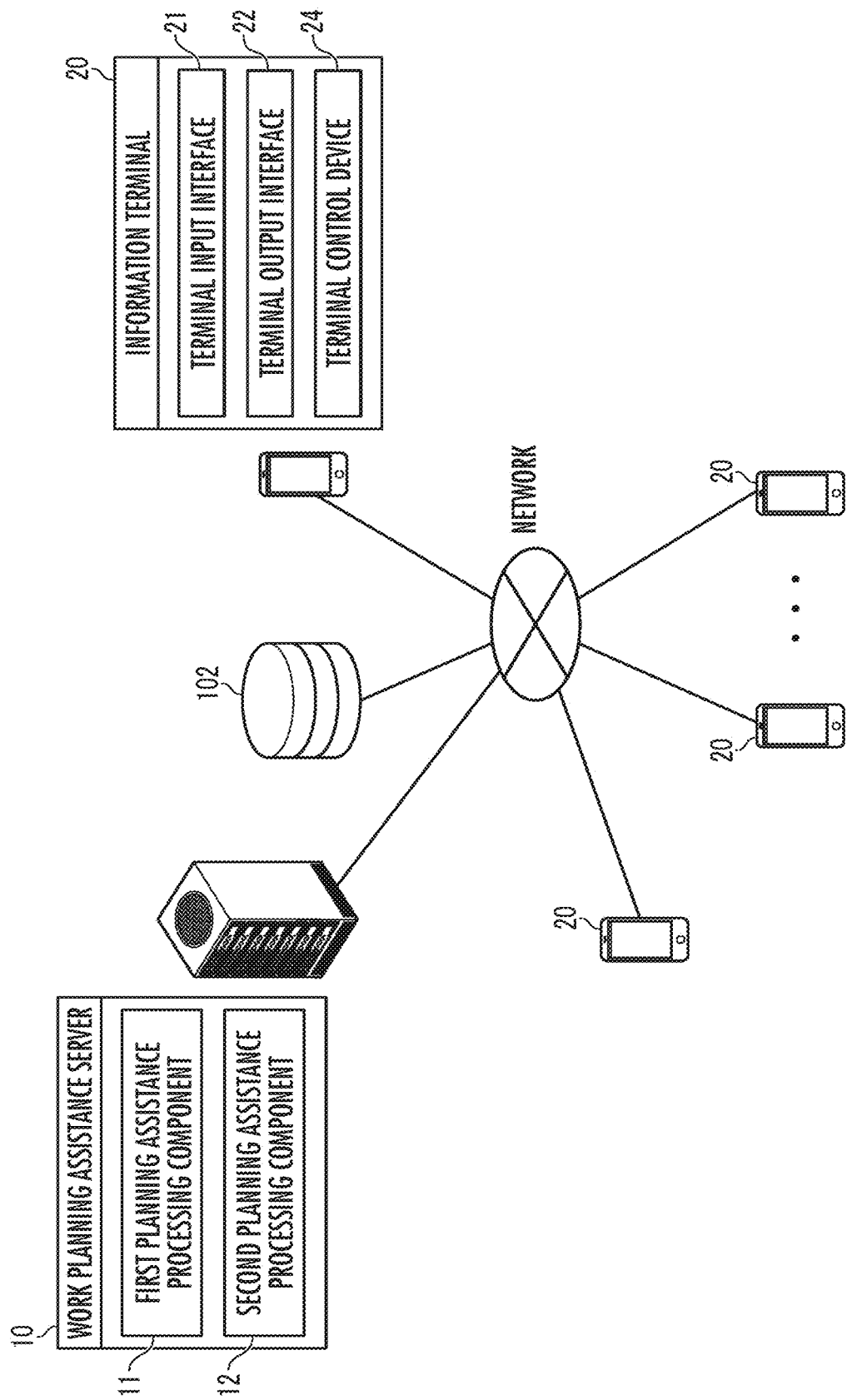
FIG. 1 is a configuration diagram of a work planning assistance device as one embodiment of the present invention.

A work planning assistance device as one embodiment of the present invention shown in FIG. 1 is configured with a work planning assistance server 10 that is capable of mutually communicating with each of information terminals 20 and a database server 102 via a network. The work planning assistance server 10 includes a first planning assistance processing component 11 and a second planning assistance processing component 12. Each of the first planning assistance processing component 11 and the second planning assistance processing component 12 is configured with an arithmetic processing device (a CPU, a processor core, or the like) and a storage device (memories such as a ROM and a RAM). It is designed that the arithmetic processing device reads necessary data and/or a program (software) from the storage device and executes arithmetic processing as described later according to the program for the data.

The database server 102 constitutes a database that stores and holds data required for work planning by each information terminal 20, such as data indicating a spatial arrangement aspect of a building and a crane in a virtual space. The database server 102 may be a component of the work planning assistance server 10.

Each information terminal 20 shown in FIG. 1 is configured with a smartphone, a tablet terminal, a personal computer, or a beacon. As shown in FIG. 1, the information terminal 20 includes a terminal input interface 21, a terminal output interface 22 and a terminal control device 24. The terminal input interface 21 is configured with capacitance-type touch buttons constituting a touch panel. The terminal output interface 22 is configured with an acoustic output device and, furthermore, wireless communication equipment in addition to an image display device constituting the touch panel. A specification signal is transmitted to the outside of the information terminal 20 by the wireless communication equipment. A terminal control device 24 is configured with an arithmetic processing device (a CPU, a processor core, or the like) and a storage device (memories such as a ROM and a RAM).

(Functions)

Functions of a remote operation assistance system and an image pickup function control system by the above components will be described, using a flowchart shown in FIG. 2. In the flowchart, each block indicated by "C●" is used for simplification of description, means transmission and/or reception of data, and means such a conditional branch that a process in a branch direction is executed on condition of transmission and/or reception of the data.

Figure 2:
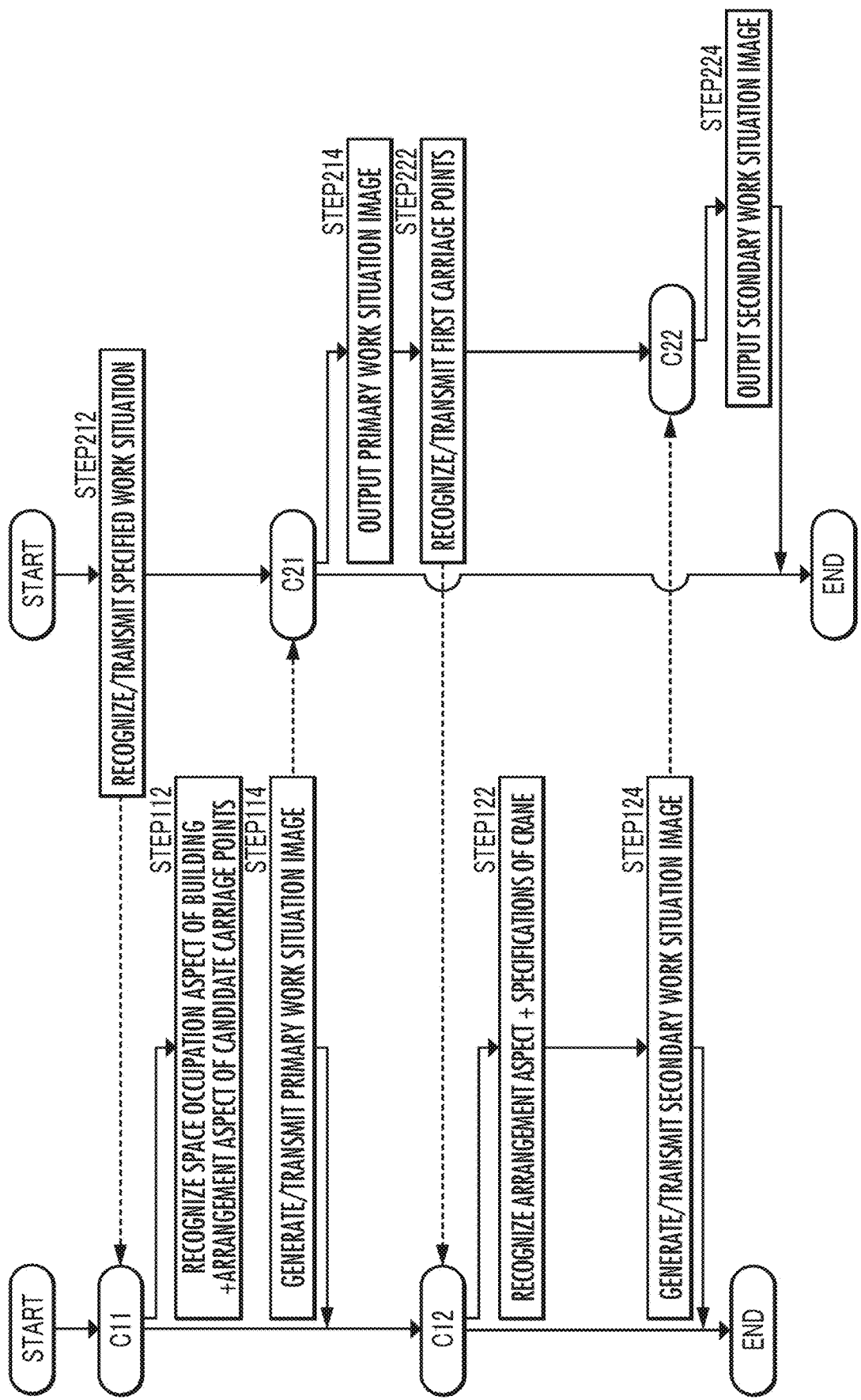
FIG. 2 is a flowchart indicating functions of the work planning assistance device.

In the information terminal 20, a specified work situation specified through the terminal input interface 21 is recognized by the terminal control device 24 and transmitted to the work planning assistance server 10 (FIG. 2/STEP 212). The "specified work situation" is a factor for recognizing a specified work situation model, which is one work situation model among a plurality of different work situation models. Each work situation model is defined by a space occupation aspect of a building and an arrangement aspect of candidate carriage points in a virtual space. Each work situation model may be defined by a landform of a point around a building where a crane may be arranged. Each situation model may be defined by a space occupation aspect of vehicles and/or workers coming and going on a site. At this time, a terminal identifier for identifying the information terminal 20 is also transmitted to the work planning assistance server 10.

When the specified work situation is received by the work planning assistance server 10 (FIG. 2/C11), a space occupation aspect of a building and an arrangement aspect of a plurality of candidate carriage points in a virtual space, which define a specified work situation model according to the specified work situation, are recognized by the first planning assistance processing component 11 (FIG. 2/STEP 112).

Figure 3:
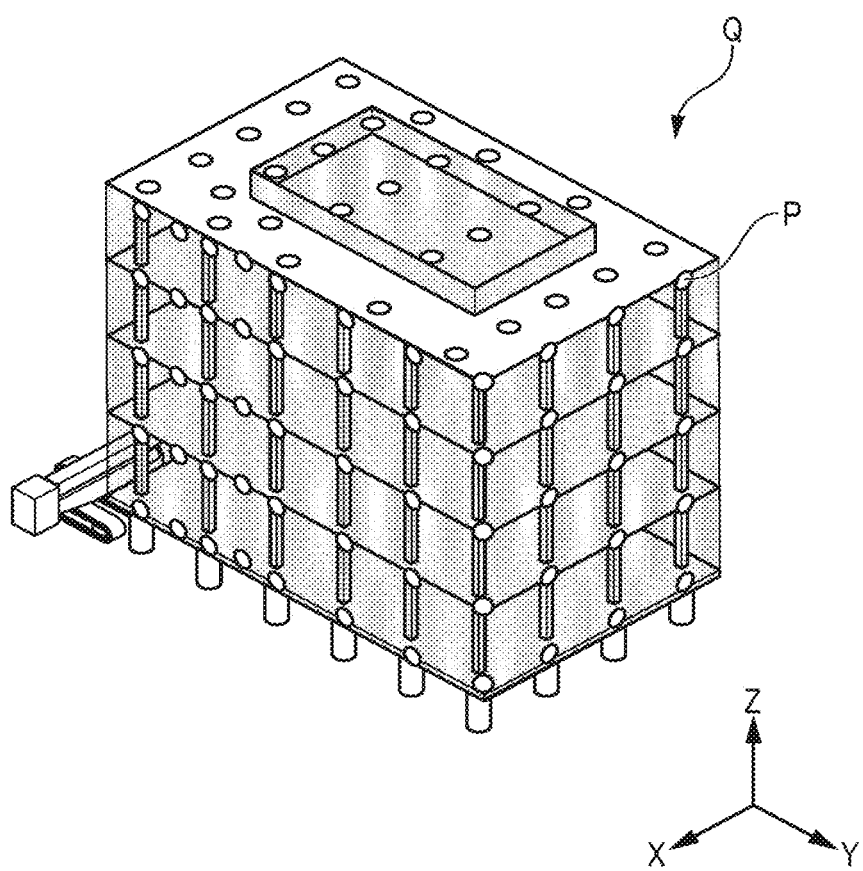
FIG. 3 is a diagram about a primary work situation image (a perspective image).
Figure 4:
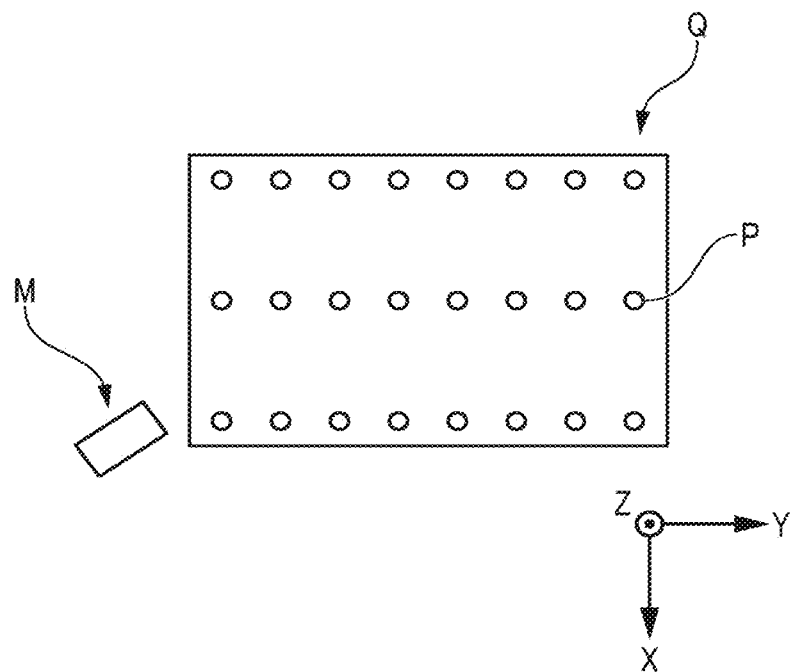
FIG. 4 is a diagram about the primary work situation image (a bird's-eye image).

According to the work situation model, for example, in a virtual space in which coordinate values (X, Y, Z) are defined by a three-dimensional Cartesian coordinate system, which is shown in FIGS. 3 and 4, a space occupation aspect of an almost rectangular parallelepiped building Q is defined by a three-dimensional area $\{X, Y, Z | X_1 \le X \le X_2, f_1(X) \le Y \le f_2(Y), g_1(X, Y) \le Z \le g_2(X, Y)\}$. Here, $f_1$ and $f_2$ are functions (for example, linear functions) of a main variable X for defining an aspect of spread of the building Q in a Y direction. $g_1$ and $g_2$ are functions of main variables X and Y for defining an aspect of spread of the building Q in a Z direction. Further, as shown in FIGS. 3 and 4, a plurality of candidate carriage points P in the virtual space are distributedly arranged on top and side parts of the building Q. The candidate carriage points P are defined by coordinate values (x, y, z) of points or a two-dimensional or three-dimensional area that spreads based on the reference points.

Next, a primary work situation image indicating the space occupation aspect of the building Q and an arrangement aspect of the plurality of candidate carriage points P are generated and transmitted to the information terminal 20 by the first planning assistance processing component 11 (FIG. 2/STEP 114).

When the primary work situation image is received by the information terminal 20 (FIG. 2/C21), the primary work situation image is output to the terminal output interface 22 by the terminal control device 24 (FIG. 2/STEP 214). Thereby, a perspective image as shown in FIG. 3 and/or a bird's-eye image as shown in FIG. 4 are/is output to the terminal output interface 22 as the primary work situation image indicating the space occupation aspect of the building Q and the arrangement aspect of the plurality of candidate carriage points P in the virtual space.

Figure 5:
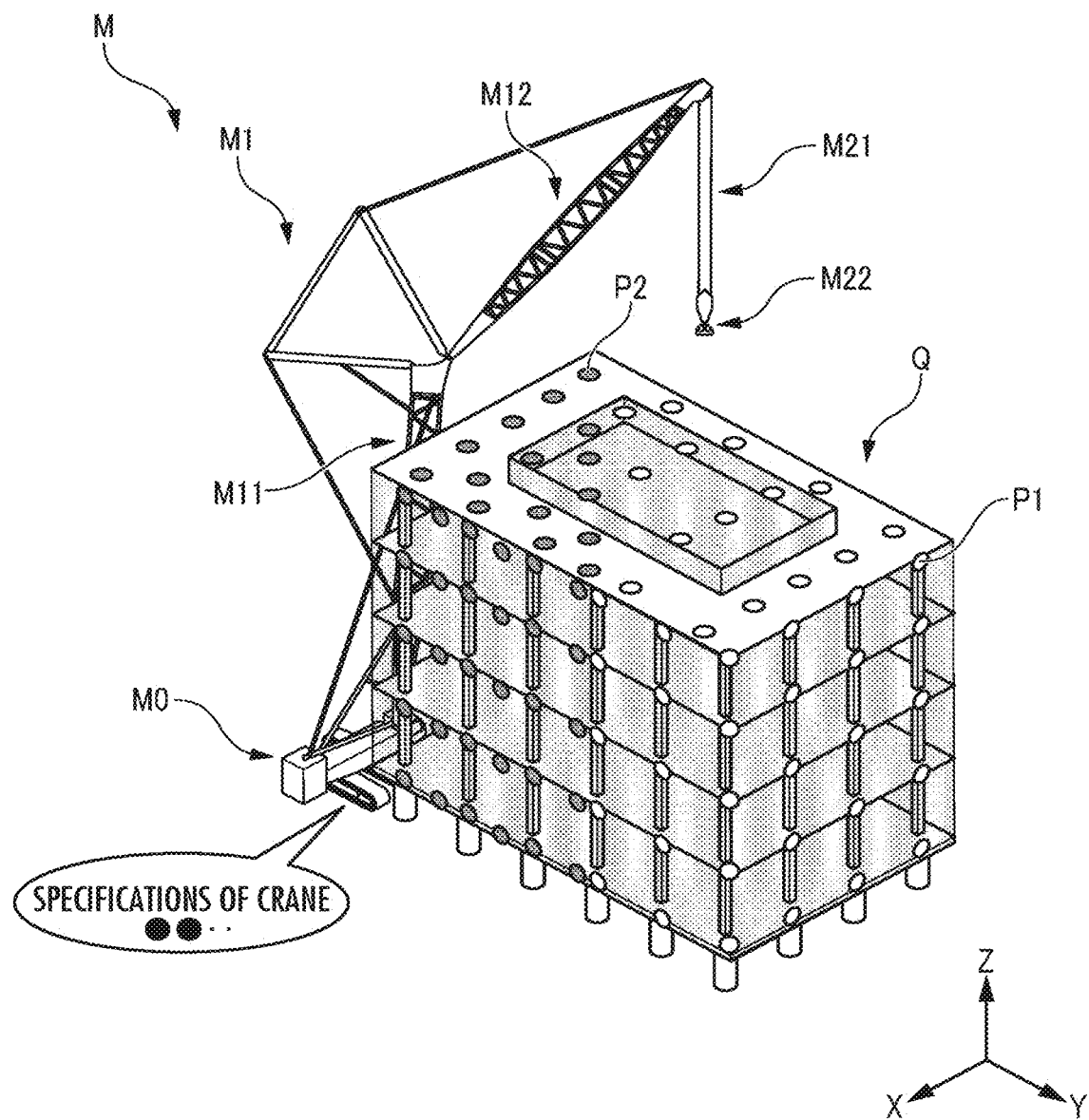
FIG. 5 is a diagram about a secondary work situation image (a perspective image).
Figure 6:
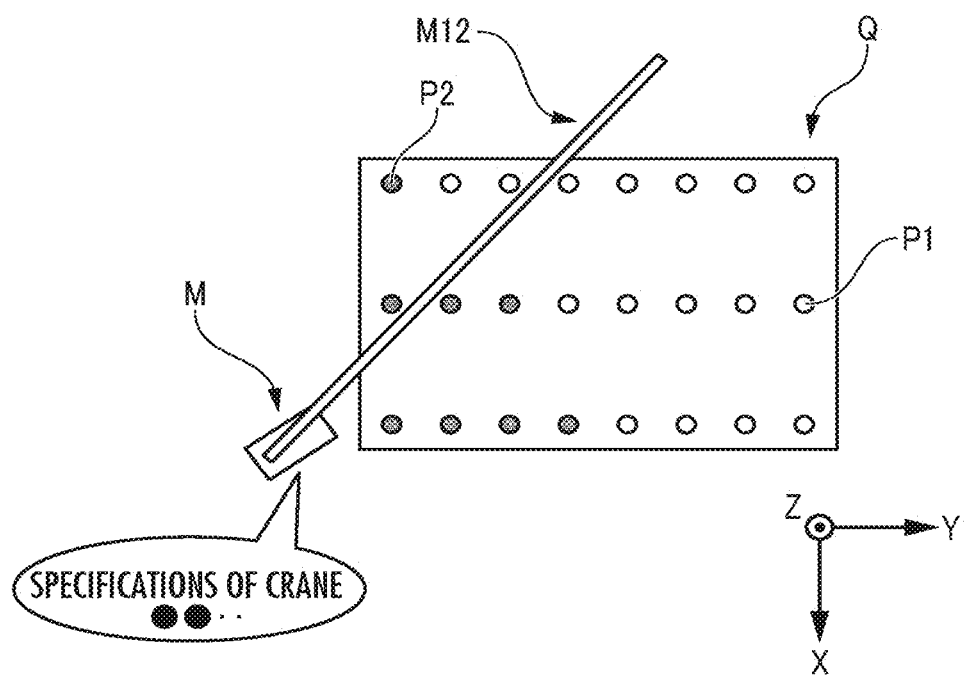
FIG. 6 is a diagram about the secondary work situation image (a bird's-eye image).

In the information terminals 20, an arrangement aspect of first carriage points P1 specified through the terminal input interface 21 is recognized by the terminal control device 24 and transmitted to the work planning assistance server 10 (FIG. 2/STEP 222). At this time, the terminal identifier for identifying the information terminal 20 is also transmitted to the work planning assistance server 10. For example, among the plurality of candidate carriage points P shown in FIGS. 3 and 4, the carriage points P1 (see white circles) are specified as shown in FIGS. 5 and 6. In FIGS. 5 and 6, second carriage points P2 (see black circles) as unspecified candidate carriage points p are also shown.

When the arrangement aspect of the first carriage points P1 is received by the work planning assistance server 10 (FIG. 2/C22), an arrangement aspect and specifications of a crane M in the virtual space making it possible to carry materials to the first carriage points P1 (or from the first carriage points P1) by the crane M while avoiding interference of the crane M and the materials with the building Q are recognized by the second planning assistance processing component 12 based on the space occupation aspect of the building Q and the arrangement aspect of the first carriage points P1 (FIG. 2/STEP 122).

Specifically, from a material carriage start point P0=(X0, Y0, Z0) to a first carriage point P1=(X1, Y1, Z1) (or from the first carriage point P1=(X1, Y1, Z1) to a carriage end point P0=(X0, Y0, Z0)), a change aspect of a position of a hook M22 and/or the material is decided as a material position trajectory such that the change aspect does not overlap with the building Q, for each of a plurality of types of cranes M with different arrangement aspects and different specifications.

For example, a position and a direction (a unit vector indicating the direction) of a base M0, which is a component of each crane M, is recognized as the arrangement aspect of the crane M.

As shown in FIG. 5, a shape and a size of each of a boom M11 and a jib M12 constituting the base M0 and an attachment M1, a tolerance ranges of a turning angle $\phi$ and an elevation angle $\theta 1$ of the boom M11, a tolerance range of an elevation angle $\theta 2$ of the jib M12, a winding limit of the hook M22 suspended from the attachment M1 via a wire M21, and the like are recognized as the specifications of the crane M. The hook M22 may include a main hook suspended from a tip part (for example, a boom point sheave) of the boom M11 and/or an auxiliary hook suspended from a tip part (for example, a jib point sheave) of the jib M12.

The tolerance range (an upper-limit height and a lower-limit height) of a height above sea level of a highest reaching part of the crane M is determined by the tolerance range of each of the elevation angles θ1 and θ2. When a structure of the crane M is different, however, the tolerance range (the upper-limit height and the lower-limit height) of the height above sea level of the highest reaching part of the crane M may be determined by the tolerance range of a quantity of state determining a position and/or a posture of a movable part of the crane M.

The plurality of types of cranes M may include a mobile crane such as a crawler crane or a wheel crane (a tire traveling crane, a rough terrain crane, a truck crane, or all terrain crane) or may include a stationary crane such as a jib crane, a climbing crane, or a tower crane. In addition to the tower crane, the crane M may be a luffing crane or a fixed jib crane. Each crane M may have a boom, a jib, a mast and/or a strut as attachments. The boom may be a lattice boom in addition to a Telesco (registered trademark) (telescopic) boom.

Further, such a time series or a change aspect of each of a turning angle ϕ and the elevation angle θ1 of the boom M11, the elevation angle θ2 of the jib M12, and a length of the wire M21 that realizes the material position trajectory is decided as a crane posture trajectory according to inverse kinematics. At this time, the crane posture trajectory is tentatively decided such that each of the turning angle ϕ and the elevation angle θ1 of the boom M11, the elevation angle θ2 of the jib M12, and the length of the wire M21 is not out of the tolerance range. For example, the tolerance range of each of the elevation angle θ1 of the boom M11 and the elevation angle θ2 of the boom M12 may be determined based on an upper-limit height position of a top edge (an upper limit of Z-coordinate value) of the crane M and/or the attachment M1.

Next, a time series or a change aspect of a space occupation aspect of the crane M, and thus the attachment M1 (and the wire M21) which are components of the crane M are decided based on the crane posture trajectory. In order to determine the space occupation aspect of the crane M in the virtual space, for example, the base M0 is defined as a rectangular parallelepiped; each of the boom M11 and the jib M12 is defined as a quadrangular prism or a cylinder; and the wire M21 is defined as a line; and the hook M22 is defined as a point. A shape and a size of the hook M22 may be defined to encompass a size of the materials to be carried.

Then, if the time series of the space occupation aspect of the crane M does not overlap with the building Q, the arrangement aspect and the specifications of the crane M are recognized as the arrangement aspect and the specifications of the crane M making it possible to carry the materials by the crane M to the first carriage points P1 while avoiding interference of the crane M and the materials with the building Q.

Next, a secondary work situation image to which the arrangement aspect and specifications of the crane M are added is generated and transmitted to the information terminal 20 by the second planning assistance processing component 12 (FIG. 2/STEP 124).

When the secondary work situation image is received by the information terminal 20 (FIG. 2/C22), the secondary work situation image is output to the terminal output interface 22 by the terminal control device 24 (FIG. 2/STEP 224). Thereby, a perspective image shown in FIG. 5 and/or a bird's-eye image shown in FIG. 6 are/is output to the terminal output interface 22 as the secondary work situation image, the secondary work situation image being the primary work situation image indicating the space occupation aspect of the building Q and the arrangement aspect of the plurality of candidate carriage points P in the virtual space, to which the arrangement aspect and the specifications of the crane M are added. As shown in each of FIGS. 5 and 6, the first carriage points P1 (see the white circles) and the second carriage points P2 (see the black circles) may be identifiably expressed in the secondary work situation image.

(Operation and Effects)

According to the work planning assistance server 10 (the work planning assistance device) that performs the functions described above, it is possible to cause a user to grasp the space occupation aspect of the building Q and the arrangement aspect of the plurality of candidate carriage points P determined based on the specified work situation specified through the terminal input interface 21 of the information terminal 20, through the primary work situation image output to the terminal output interface 22 of the information terminal 20 (see FIG. 2/STEP 212→C11→STEP 112→STEP 114→C21→STEP 214, and FIGS. 3 and 4). Thereby, it is possible to cause the user to take a guess where the crane M is to be arranged, in consideration of the space occupation aspect of the building Q and the arrangement aspect of the plurality of candidate carriage points P.

Furthermore, it is possible to cause the user who has specified the first carriage points P1 through the terminal input interface 21 to grasp the arrangement aspect and the specifications of the crane M for carrying the materials to the first carriage points P1 (or from the first carriage points P1) by the crane M while avoiding interference of the crane M and the materials with the building Q, through the secondary work situation image output to the terminal output interface 22 of the information terminal 20 (see FIG. 2/STEP 222→C12→STEP 122→STEP 124→C22→STEP 224, and FIGS. 5 and 6). Thereby, it is possible to make it easy to decide a work plan including selection of the arrangement aspect and the specifications of the crane M according to a specification aspect of the first carriage points P1 more accurately.

Other Embodiments of the Present Invention

Though the work planning assistance device is configured with the work planning assistance server 10 in the above embodiment, the work planning assistance device may be configured with the information terminal 20 as another embodiment. That is, the first planning assistance processing component 11 and/or the second planning assistance processing component 12 may be configured with the terminal control device 24.

The first planning assistance processing component 11 may cause the primary work situation image, which indicates the time series of each of the space occupation aspect of the building Q and the arrangement aspect of the plurality of candidate carriage points P, to be output to the terminal output interface 22, and recognize a time series of the arrangement aspect of the first carriage points P1 specified through the terminal input interface 21. Further, the second planning assistance processing component 12 may recognize a time series of the material attributes input through the terminal input interface 21, recognize the time series of the arrangement aspect and of the specifications of the crane M for carrying the materials having the material attributes to the first carriage points P1 while avoiding the interference of each of the crane M and the materials with the building Q based on the time series of each of the space occupation aspect of the building Q, the first carriage points P1, and the material attributes, generate the secondary work situation image, the secondary work situation image being the primary work situation image to which the time series of the arrangement aspect and of the specifications of the crane M are added, and cause the secondary work situation image to be output to the terminal output interface 22.

According to the work planning assistance device in the above configuration, it is possible to cause the user who sees the primary work situation image output to the terminal output interface 22 to grasp the time-series of each of the space occupation aspect of the building Q and the arrangement aspect of the plurality of candidate carriage points P. For example, a primary work situation image (a plurality of intermittent still images or video) showing that the building Q shown in each of FIGS. 3 and 4 is extended (for example, in the Z direction) according to work progress, and new candidate carriage points P appear on an extended part (furthermore, candidate carriage points P that have existed so for disappear) is output to the terminal output interface 22. Thereby, it is possible to cause the user to take a guess which candidate carriage point P at which position is to be specified as a first carriage point P1 at each point of time, in consideration of the space occupation aspect of the building Q and the arrangement aspect of the plurality of candidate carriage points P.

Furthermore, it is possible to cause the user who has specified the arrangement aspect of the first carriage points P1 through the terminal input interface 21 to grasp a time-series change aspect of the arrangement aspect and/or the specifications of the crane M for carrying the materials to the first carriage points P1 (or from the first carriage points P1) by the crane M while avoiding interference of the crane M and the materials with the building Q, through the secondary work situation image output to the terminal output interface 22. For example, the secondary work situation image (a plurality of intermittent still images or video) in which the arrangement aspect and/or the specifications of the crane M shown in each of FIGS. 5 and 6 are/is transitioning is output to the terminal output interface 22. For example, it is possible to cause the user to grasp such transition that a crane M1 having first specifications is arranged in a first posture at a first point in a first work period, and a crane M2 having second specifications that are the same as or different from the first specifications is arranged in a second posture at a second point different from the first point in a second work period after the first work period. Thereby, it is possible to make it easy to decide a work plan including time-series selection of the arrangement aspect and the specifications of the crane M according to the specification aspect of the first carriage points P1 more accurately.

The second planning assistance processing component 12 may recognize one time series in which frequency of changing the specifications of the crane M is the lowest among a plurality of time series of combinations of the arrangement aspect and the specifications of the crane M, generate the secondary work situation image, the secondary work situation image being the primary work situation image to which the one time series of the combination of the arrangement aspect and the specifications of the crane M is added, and cause the secondary work situation image to be output to the terminal output interface 22.

According to the work planning assistance device in the above configuration, it is possible to cause the user who has specified the candidate carriage points and the material attributes through the terminal input interface 21 to grasp an appropriate time series of the arrangement aspect and the specifications of the crane M for carrying the materials to the first carriage points P1 while avoiding interference of the crane M and the materials with the building Q, through the secondary work situation image output to the terminal output interface 22 so that the frequency of changing the specifications of the crane M is the lowest. For example, between one time series defined by the crane M1 having the first specifications in the first work period, the crane M2 having the second specifications in the second work period after the first work period, and a crane M3 having third specifications in a third work period after the second work period, and another time series defined by the crane M2 having the second specifications in the first work period and the second work period after the first work period and the crane M3 having the third specifications in the third work period, the other time series is selected as the time series for which the frequency of changing the specifications of the crane is the lowest. Therefore, it is possible for the user to easily decide how a crane M having which specifications is to be arranged around the building Q in time series (at each of different points of time) so that the frequency of changing the specifications of the crane M is the lowest, regardless of the user's knowledge/experience.

The second planning assistance processing component 12 may limit the material attributes that can be specified through the terminal input interface 21, according to a selectable arrangement aspect and specifications of the crane M.

Figure 7:
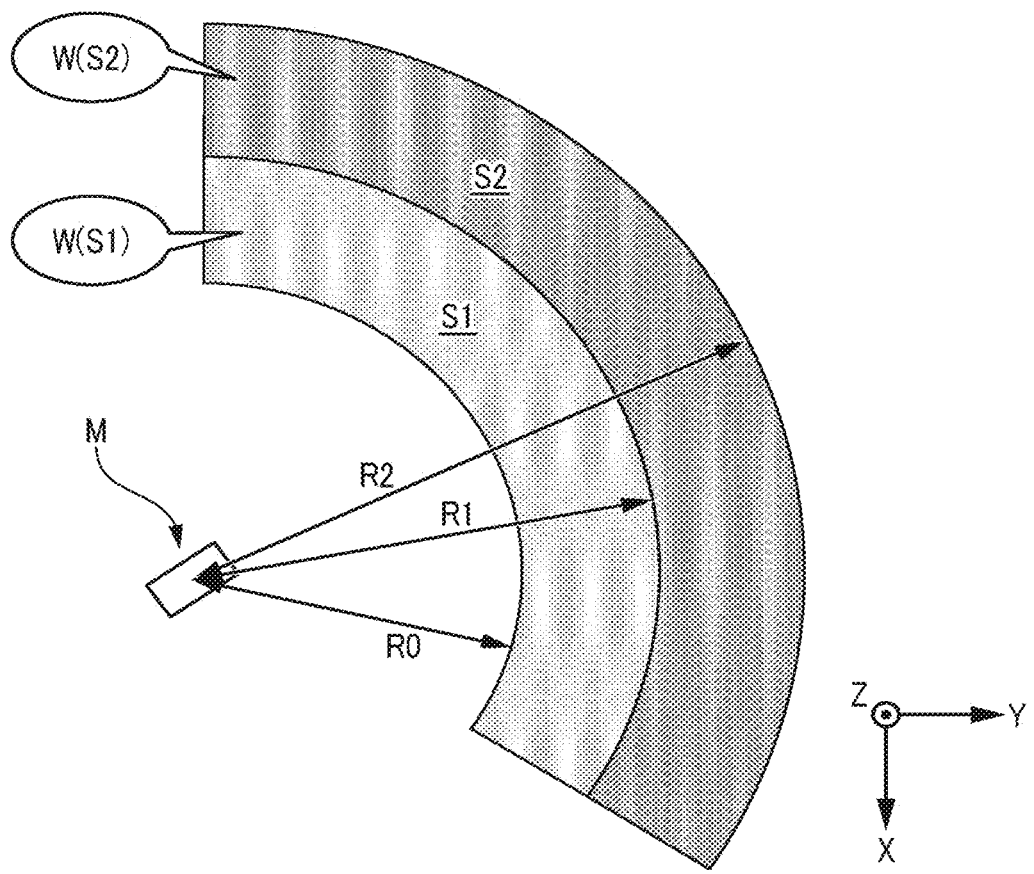
FIG. 7 is a diagram about an output aspect of material attribute information.

For example, as shown in FIG. 7, a plurality of circular-arc shaped areas S1 and S2 as movement areas of the hook M22 in a state of the wire M21 extending in a vertical direction or the Z direction, corresponding to a movement range of the attachment M1 based on the crane M or the base M0 thereof, and masses W(S1) and W(S2) (furthermore, shapes and sizes) of materials that can be carried in the inner circular-arc shaped area S1 and the outer circular-arc shaped area S2, respectively, are defined. An inner diameter R0 and an outer diameter R1 of the inner circular-arc shaped area S1 are geometrically determined based on the tolerance range of the elevation angle $\theta 1$ of the boom M11 and the tolerance range of the elevation angle $\theta 2$ of the jib M12 that are determined according to the material weight W (S1). An inner diameter R1 and an outer diameter R2 of the outer circular-arc shaped area S2 are geometrically determined based on the tolerance range of the elevation angle $\theta 1$ of the boom M11 and the tolerance range of the elevation angle $\theta 2$ of the jib M12 that are determined according to the material weight W (S2) (<W(S1)).

Figure 8:
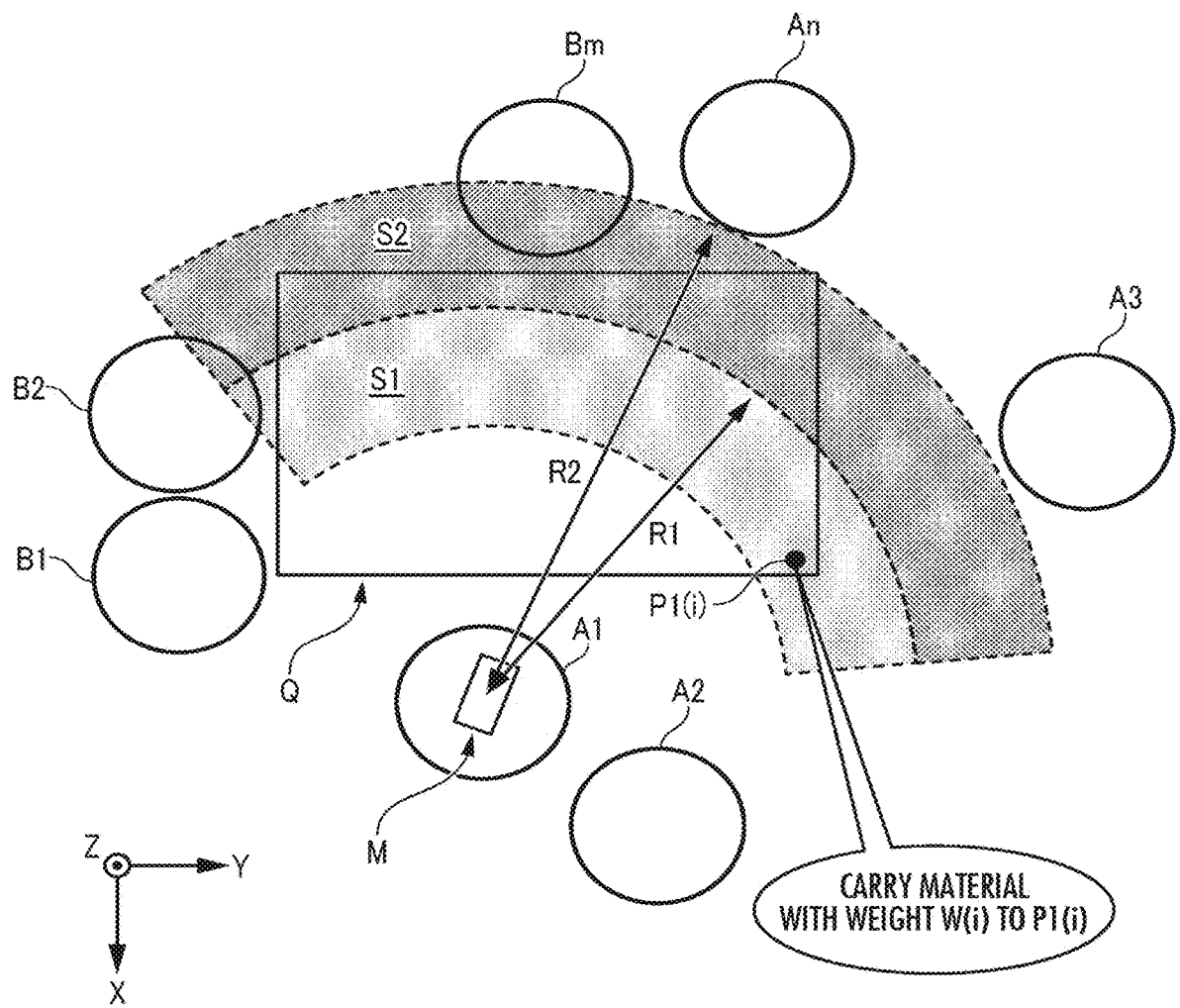
FIG. 8 is a diagram about an aspect of restricting specification of second factors.

Here, if a material weight W(i) (W(S2)<W(i)≤W(S1)) is specified as a material attribute, specification of an arrangement aspect of the crane M at any of the candidate arrangement points B1, B2, . . . , Bm at which the inner circular-arc shaped area S1 shown in FIG. 7 does not overlap with a first carriage point P1(i), among candidate arrangement points of the crane M A1, A2, . . . , Am and B1, B2, . . . , Bm shown in FIG. 8, is prohibited.

On the other hand, specification of the arrangement aspect of the crane M at any of the candidate arrangement points A1, A2, . . . , Am at which the inner circular-arc shaped area S1 shown in FIG. 7 overlaps with the first carriage point P1(i) is allowed. Further, if a material weight W(i) (W(i) ≤W(S2)) is specified as a material attribute, specification of an arrangement aspect of the crane M at any of the candidate arrangement points B1, B2, . . . , Bm at which the outer circular-arc shaped area S2 shown in FIG. 7 overlaps with the first carriage points P1(i), among the candidate arrangement points of the crane M A1, A2, . . . , Am and B1, B2, . . . , Bm shown in FIG. 8, is allowed.

According to the work planning assistance device in the above configuration, by material attributes that the user can specify through the terminal input interface 21 being restricted in consideration of selectable crane arrangement aspects and/or specifications, it is avoided that such unreasonable work planning assistance information that the arrangement aspect and/or the specifications of the crane M are exceeded is generated.

The second planning assistance processing component 12 may recognize the arrangement aspect and the specifications of the crane M for carrying the materials to the first carriage points P1 based on the space occupation aspect of the building Q, the arrangement aspect of the first carriage points P1, the material attributes, and external factors that affect a situation of carriage of the materials by the crane M.

According to the work planning assistance device in the above configuration, it is possible to cause the user who sees the secondary work situation image output to the terminal output interface 22 to grasp the arrangement aspect and the specifications of the crane M making it possible to carry the materials to the first carriage points P1 by the crane M while avoiding interference of the crane M and the materials with the building Q, in consideration of the external factors that affect the situation of carriage of the materials by the crane M. The "external factors" include the tolerance range of the height above sea level of the highest reaching part of the crane M, a geographical area where the base M0 of the crane M can be arranged, weather conditions (presence/absence of rainfall/snowfall, an amount of rain/snow, presence/absence of freezing, and the like) determining a geographical area, and/or a direction of and speed of wind to the crane M and the materials. Thereby, it is possible to make it easy to decide a work plan including selection of the arrangement aspect and the specifications of the crane M in consideration of effects of the external factors, according to the specification aspect of the first carriage points P1 more accurately.

The second planning assistance processing component 12 may recognize the time series of at least one of the arrangement aspect and the specifications of the crane M for carrying the materials to the first carriage points P1 based on a time series of the external factors, generate the secondary work situation image, the secondary work situation image being the primary work situation image where at least one of the time series of the arrangement aspect of the crane M and the specifications is expressed in a time series, and cause the secondary work situation image to be output to the terminal output interface 22.

According to the work planning assistance device in the above configuration, it is possible to cause the user who sees the secondary work situation image output to the terminal output interface 22 to grasp the time series of the arrangement aspect and/or the specifications of the crane M making it possible to carry the materials to the first carriage points P1 by the crane M while avoiding interference of the crane M and the materials with the building Q, in consideration of the external factors that affect the situation of carriage of the materials by the crane M. Thereby, it is possible to make it easy to decide a work plan including time-series selection of the arrangement aspect and/or the specifications of the crane M in consideration of effects of the external factors, according to the specification aspect of the first carriage points P1 more accurately.

In the work planning assistance device in the above configuration, it is preferable that the second planning assistance processing component recognizes the arrangement aspect and the specifications of the crane for carrying the materials to the first carriage points based on the space occupation aspect of the building, the arrangement aspect of the first carriage points, the material attributes, and the external factors that affect a situation of carriage of the materials by the crane.

According to the work planning assistance device in the above configuration, it is possible to cause the user who sees the secondary work situation image output to the output interface to grasp the arrangement aspect and the specifications of the crane making it possible to carry the materials to the first carriage points by the crane while avoiding interference of the crane and the materials with the building, in consideration of the external factors that affect the situation of carriage of the materials by the crane. Thereby, it is possible to make it easy to decide a work plan including selection of the arrangement aspect and the specifications of the crane in consideration of effects of the external factors, according to the specification aspect of the first carriage points more accurately.

In the work planning assistance device in the above configuration, it is preferable that the second planning assistance processing component recognizes a time series of at least one of the arrangement aspect and the specifications of the crane for carrying the materials to the first carriage points based on a time series of the external factors, generates the secondary work situation image, the secondary work situation image being the primary work situation image where at least one of the time series of the arrangement aspect of the crane or the specifications is expressed in a time series, and causes the secondary work situation image to be output to the output interface.

According to the work planning assistance device in the above configuration, it is possible to cause the user who sees the secondary work situation image output to the output interface to grasp the time series of the arrangement aspect and/or the specifications of the crane making it possible to carry the materials to the first carriage points by the crane while avoiding interference of the crane and the materials with the building, in consideration of the external factors that affect the situation of carriage of the materials by the crane. Thereby, it is possible to make it easy to decide a work plan including time-series selection of the arrangement aspect and/or the specifications of the crane in consideration of effects of the external factors according to the specification aspect of the first carriage points more accurately.

In the work planning assistance device in the above configuration, it is preferable that the first planning assistance processing component causes the primary work situation image, which indicates a time series of each of the space occupation aspect of the building and the arrangement aspect of the plurality of candidate carriage points, to be output to the output interface, and recognizes a time series of the arrangement aspect of the first carriage points specified through the input interface; and the second planning assistance processing component recognizes a time series of the material attributes input through the input interface, recognizes the time series of the arrangement aspect and of the specifications of the crane for carrying the materials having the material attributes to the first carriage points while avoiding the interference of each of the crane and the materials with the building based on the time series of each of the space occupation aspect of the building, the first carriage points, and the material attributes, generates the secondary work situation image, the secondary work situation image being the primary work situation image to which the time series of the arrangement aspect and of the specifications of the crane are added, and causes the secondary work situation image to be output to the output interface.

According to the work planning assistance device in the above configuration, it is possible to cause the user to grasp the time series of each of the space occupation aspect of the building and the arrangement aspect of the plurality of candidate carriage points, through the primary work situation image output to the output interface. Thereby, it is possible to cause the user to take a guess which candidate carriage point at which position is to be specified as a first carriage point at each point of time, in consideration of the space occupation aspect of the building and the arrangement aspect of the plurality of candidate carriage points.

Furthermore, it is possible to cause the user who has specified the arrangement aspect of the first carriage points through the input interface to grasp the arrangement aspect and the specifications of the crane for carrying the materials to the first carriage points (or from the first carriage points) by the crane while avoiding interference of the crane and the materials with the building, through the secondary work situation image output to the output interface. Thereby, it is possible to make it easy to decide a work plan including selection of the arrangement aspect and the specifications of the crane, according to the specification aspect of the first carriage points more accurately.

In the work planning assistance device in the above configuration, it is preferable that the second planning assistance processing component recognizes one time series in which frequency of changing the specifications of the crane is the lowest among a plurality of time series of combinations of the arrangement aspect and the specifications of the crane, generates the secondary work situation image, the secondary work situation image being the primary work situation image to which the one time series of the combination of the arrangement aspect and the specifications of the crane is added, and causes the secondary work situation image to be output to the output interface.

According to the work planning assistance device in the above configuration, it is possible to cause the user who has specified the candidate carriage points and the material attributes through the input interface to grasp the appropriate time series of the arrangement aspect and the specifications of the crane for carrying the materials to the first carriage points while avoiding interference of the crane and the materials with the building, through the secondary work situation image output to the output interface so that the frequency of changing the specifications of the crane is the lowest. Therefore, it is possible for the user to easily decide how a crane having which specifications is to be arranged around a building in time series (at each of different points of time) so that the frequency of changing the specifications of the crane is the lowest, regardless of the user's knowledge/experience.

In the work planning assistance device in the above configuration, it is preferable that the second planning assistance processing component limits material attributes that can be specified through the input interface, according to a selectable arrangement aspect and specifications of the crane.

According to the work planning assistance device in the above configuration, by material attributes that the user can specify through the input interface being restricted in consideration of the selectable crane arrangement aspects and/or specifications, it is avoided that such unreasonable work planning assistance information that the arrangement aspect and/or the specifications of the crane are exceeded is generated.

REFERENCE SIGNS LIST

10 work planning assistance server (work planning assistance device)
11 first planning assistance processing component
12 second planning assistance processing component
20 information terminal
21 terminal input interface
22 terminal output interface
An candidate arrangement position
Bm candidate arrangement position
M crane
M0 base
M1 attachment
M11 boom
M12 jib
M21 wire
M22 hook
P candidate carriage point
P1 first carriage point
P2 second carriage point

The invention claimed is:
1. A work planning assistance device which communicates with at least one information terminal device via a network, wherein the at least one information terminal device includes an input interface and an output interface, the work planning assistance device comprising:
 a first planning assistance processing component configured to communicate with the at least one information terminal device to i) cause a primary work situation image indicating a space occupation aspect of a building and an arrangement aspect of a plurality of candidate carriage points to be output to the output interface, ii) recognize candidate carriage points specified through the input interface from among the plurality of candidate carriage points as first carriage points, and iii) cause the first carriage points to be output to the output interface in a form distinguishable from second carriage points, which are other candidate carriage points, in the primary work situation image; and
 a second planning assistance processing component configured to communicate with the at least one information terminal device to i) recognize material attributes specified through the input interface, ii) recognize an arrangement aspect and specifications of a crane for carrying materials having the material attributes to the first carriage points while avoiding interference of each of the crane and the materials with the building, based on the space occupation aspect of the building, an arrangement aspect of the first carriage points, and the material attributes, iii) generate a secondary work situation image, the secondary work situation image being the primary work situation image to which the arrangement aspect and the specifications of the crane are added, and iv) cause the secondary work situation image to be output to the output interface,
 wherein the second planning assistance processing component recognizes one time series in which frequency of changing the specifications of the crane is the lowest among a plurality of time series of combinations of the arrangement aspect and the specifications of the crane, generates the secondary work situation image, the secondary work situation image being the primary work situation image to which the one time series of the combination of the arrangement aspect and the specifications of the crane is added, and causes the secondary work situation image to be output to the output interface so that the crane is arranged around the building at each of different points of time for the frequency of changing the specifications of the crane to be the lowest.

2. The work planning assistance device according to claim 1, wherein
the second planning assistance processing component recognizes the arrangement aspect and the specifications of the crane for carrying the materials to the first carriage points based on the space occupation aspect of the building, the arrangement aspect of the first carriage points, the material attributes, and external factors that affect a situation of carriage of the materials by the crane.

3. The work planning assistance device according to claim 2, wherein
the second planning assistance processing component recognizes a time series of at least one of the arrangement aspect and the specifications of the crane for carrying the materials to the first carriage points based on a time series of the external factors, generates the secondary work situation image, the secondary work situation image being the primary work situation image where at least one of the time series of the arrangement aspect of the crane and the specifications is expressed in a time series, and causes the secondary work situation image to be output to the output interface.

4. The work planning assistance device according to claim 1, wherein
the first planning assistance processing component causes the primary work situation image, which indicates a time series of each of the space occupation aspect of the building and the arrangement aspect of the plurality of candidate carriage points, to be output to the output interface, and recognizes a time series of the arrangement aspect of the first carriage points specified through the input interface; and
the second planning assistance processing component recognizes a time series of the material attributes input through the input interface, recognizes the time series of the arrangement aspect and of the specifications of the crane for carrying the materials having the material attributes to the first carriage points while avoiding the interference of each of the crane and the materials with the building based on the time series of each of the space occupation aspect of the building, the first carriage points, and the material attributes, generates the secondary work situation image, the secondary work situation image being the primary work situation image to which the time series of the arrangement aspect and of the specifications of the crane are added, and causes the secondary work situation image to be output to the output interface.

5. The work planning assistance device according to claim 1, wherein
the second planning assistance processing component limits material attributes that can be specified through the input interface, according to a selectable arrangement aspect and specifications of the crane.

6. A work planning assistance method comprising a first planning assistance process and a second planning assistance process that communicate with at least one information terminal device via a network, the at least one information terminal device includes an input interface and an output interface, wherein
the first planning assistance process comprises communicating with the at least one information terminal device to:
cause a primary work situation image indicating a space occupation aspect of a building and an arrangement aspect of a plurality of candidate carriage points to be output to an output interface;
recognize candidate carriage points specified through an input interface from among the plurality of candidate carriage points as first carriage points; and
cause the first carriage points to be output to the output interface in a form distinguishable from second carriage points, which are other candidate carriage points, in the primary work situation image; and
the second planning assistance process comprises steps of communicating with the at least one information terminal device to:
recognize material attributes specified through the input interface;
recognize an arrangement aspect and specifications of a crane for carrying materials having the material attributes to the first carriage points while avoiding interference of each of the crane and the materials with the building, based on the space occupation aspect of the building, an arrangement aspect of the first carriage points, and the material attributes;
generate a secondary work situation image, the secondary work situation image being the primary work situation image to which the arrangement aspect and the specifications of the crane are added; and
cause the secondary work situation image to be output to the output interface,
wherein the second planning assistance process recognizes one time series in which frequency of changing the specifications of the crane is the lowest among a plurality of time series of combinations of the arrangement aspect and the specifications of the crane, generates the secondary work situation image, the secondary work situation image being the primary work situation image to which the one time series of the combination of the arrangement aspect and the specifications of the crane is added, and causes the secondary work situation image to be output to the output interface so that the crane is arranged around the building at each of different points of time for the frequency of changing the specifications of the crane to be the lowest.

* * * * *